(12) United States Patent
Hersh

(10) Patent No.: US 8,597,752 B1
(45) Date of Patent: Dec. 3, 2013

(54) REPOSITIONABLE SELF STICK PAINT SWATCH FOR TESTING SAMPLES OF PAINTS ON A WALL

(75) Inventor: William B. Hersh, White Plains, NY (US)

(73) Assignee: Myra Hersh, White Plains, NY (US)

( * ) Notice: Subject to any disclaimer, the term of this patent is extended or adjusted under 35 U.S.C. 154(b) by 198 days.

(21) Appl. No.: 13/037,743

(22) Filed: Mar. 1, 2011

Related U.S. Application Data

(60) Provisional application No. 61/309,551, filed on Mar. 2, 2010.

(51) Int. Cl.
*B32B 9/00* (2006.01)
*B32B 33/00* (2006.01)
*G01N 33/26* (2006.01)

(52) U.S. Cl.
USPC .......................................... 428/40.1; 73/866

(58) Field of Classification Search
USPC ............................................ 428/40.1; 73/866
See application file for complete search history.

(56) References Cited

U.S. PATENT DOCUMENTS

| 3,032,181 | A  | * | 5/1962  | Hutter et al. | 428/192 |
| 6,416,612 | B1 | * | 7/2002  | Lerner et al. | 156/277 |
| 6,649,238 | B2 | * | 11/2003 | Chess et al.  | 428/40.1 |
| 2007/0122612 | A1 | * | 5/2007  | Young et al.  | 428/343 |
| 2012/0031540 | A1 | * | 2/2012  | Peltz et al.  | 156/64 |

\* cited by examiner

*Primary Examiner* — Patricia Nordmeyer
(74) *Attorney, Agent, or Firm* — Levisohn Berger LLP

(57) ABSTRACT

A swatch sheet which is thin and pliable used for testing paint samples allows for paint to be placed on the viewable surface and prevents curling of the surface. A unique combination of a latex impregnated saturated paper, an acrylic microsphere adhesive and a release liner are provided, allowing for a substantially thin and pliable swatch to be applied on a flat or any other contoured or corner surface and be easily removed therefrom.

6 Claims, No Drawings

REPOSITIONABLE SELF STICK PAINT SWATCH FOR TESTING SAMPLES OF PAINTS ON A WALL

RELATED APPLICATIONS

This nonprovisional application claims domestic priority to prior provisional application Ser. No. 61/309,551, filed Mar. 2, 2010, which is incorporated herein by reference

BACKGROUND OF THE INVENTION

This invention relates to a new and improved system for allowing people to utilize a self stick sheet of paper or swatch, to which paint is applied to test paint samples and see how the color works in the exact space or multiple spaces to which the swatch or swatches are attached.

Selecting appropriate paint samples for painting home and offices and other places is often difficult because the paint sample in the store often is misrepresentative of how the paint will actually look on a wall at a specific location in view of the light and other environmental conditions existing thereat.

There exists in the prior art a patent application filed by Julie Boney, Ser. No. 11/827,645, entitled Portable Apparatus for Visualizing and Practicing Wall Finishes, Publication No. US 2008/0014561, filed Jul. 12, 2007. This patent application describes a product in which the consumer is enabled to visualize and practice color, finish technique or texture by applying paint to a primed first surface with a second rear surface permitting the substrate to be attached to a flat mounting surface, such as a wall.

A problem with this and other prior art is that merely using a substrate with a primed first surface and a second surface having a means to secure the substrate to a mounting surface produces a product which tends to curl especially at its edges. In order to eliminate such curl, one approach in the prior art is to use significant adhesive along the edges, but such an approach interferes with the ability of the prior art devices to easily be removed and repositioned, as desired. Additionally, since the curling occurs because of the interaction of the paint on a surface, the prior art does not effectively deal with this problem.

The product of this invention can be sold in sheets of various sizes or in rolls, and in whatever form a manufacturer desires. Its intended use is that the consumer will paint on the paper anywhere and place the swatch sheet in an area reasonably proximate to the location where the paint sample will be used. Additionally, the sheet could be placed on a wall without paint and the paint can be applied while on the wall. In either case, the consumer has to opportunity to observe how the paint works in the specific location desired and remove the swatch from the wall after the sample is observed, and the swatch can be removed and reapplied elsewhere.

Applicant has addressed the above curling problem by providing a stay flat sheet which can accept paint and which controls absorption and prevents paint passing through the painted surface and a self-stick adhesive rear surface attached to a liner, so that paint is applied while the liner is attached to the swatch. The liner is thereafter removed, permitting the painted stay flat sheet to be placed on a wall or wherever appropriate. It will remain flat and be removable to be repositionable elsewhere as desired with no residue left on the wall.

A unique aspect of the present invention is the provision of a stay flat sheet which prevents curling when the sheet is painted and subsequently attached to a wall surface. The novel sheet is thin enough so as to be pliable, bend into and around corners, around moldings and otherwise be adaptable to almost any uneven surface to which paint is to be applied. The swatch sheet of this invention is pliable in orthogonal directions.

In accordance with the present invention, paint is first applied to the sheet by the consumer, and the release liner is removed from the rear of the sheet transferring adhesive to the rear face of the sheet allowing the sheet to be placed flat against a wall, yet be removed and repositioned elsewhere as desired.

The stay flat sheet may either be of a conventional stay flat paper product, not used for this purpose or any other stay flat sheet which has similar characteristics of preventing paint from migrating through the painted surface. The stay flat sheet, preferably, comprises a latex impregnated saturated paper which controls absorption and does not allow paint to pass therethrough. Therefore, when paint is applied, as taught by this invention to the swatch, the swatch product will not curl. Such stay flat paper conventionally is used in the printing processes, and the present invention takes advantage of such properties to prevent such curling.

The stay flat sheet further incorporates a rear adhesive and release paper. The removable swatch sheet of this invention further has a rear surface of the stay flat sheet to which is applied an acrylic microsphere adhesive and a stay flat release liner, preferably generally known as a standard 50 lb stay flat liner. The release liner is removed from the rear surface, and the acrylic microsphere adhesive remains on the rear of the stay flat sheet permitting easy applying of the sheet to any surface as desired and easy removal therefrom.

The adhesive is an important element of this invention in that it must be such so that when the release liner is removed from the rear surface, the adhesive is transferred to the rear surface of the resultant sheet so that the sheet can be placed flat on a wall or surface, removed therefrom and repositioned in any other location.

This invention has a number of advantages. First of all, the stay flat sheet can applied in situ to interior or exterior surfaces and on surfaces which are not only flat but also corners due to the relatively thin and pliable nature of the invention. It will stay flush to the wall so that it appears as part of the wall and one viewing how the color works, in situ, has the best vantage point for such observation.

A consumer or designer can check multiple colors at one time, comparing them in an easy and simple fashion in situ so as to make decisions on color coordination or other aspects of situations in which painting is required.

The present invention may also include a place on the back of the liner for the customer to initial approval and for any person working with the customer such as a decorator or designer to also sign an approval so as to maintain paper records of color choices made as projects proceed.

It is also possible that the swatch could be painted at any location, and a decorator or designer could send multiple variations to be tried in situ by the consumer without the decorator or designer needing to travel and to physically be present when such swatches are applied.

While the present invention is described for checking paint colors in situ, such a non-bleed top surface could be used for more frivolous purposes, such as receiving crayon designs, glitter, glue, pen and pencil drawings, all of which can be suitably applied to the top surface without bleeding therethrough and attractively attached wherever desired and, yet, may be simply removed from the surface to which the swatch is attached.

In addition to the Boney patent application above, other prior art documents are US Patent Application Publication 2007/0122612 to Young et al.; US Patent Application Publication 2002/009221 to DaRif et al.; US Publication 2003/0032907 to Lerner et al.; US Patent Application Publication 2008/0014561 to Boney; and U.S. Pat. Nos. 4,379,696 and 4,061,521 to Lerner. All such prior art is incorporated herein by reference.

It should be understood that the preferred embodiment was described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly legally and equitably entitled.

The invention claimed is:

1. A removable swatch sheet for temporary attachment to a surface for viewing a paint color painted on said swatch sheet, said swatch sheet comprising a multilayer construction comprising
    a paintable paper layer having a top and bottom, said paper preventing paint absorption therethrough and comprising latex impregnated saturated paper, said paint color being painted on said top covering at least a portion of said swatch sheet,
    an adhesive surface comprising a layer of adhesive applied to the bottom of said paper layer, wherein said adhesive comprises microsphere adhesive,
    a release layer attached to the bottom of said paper layer through said adhesive surface, wherein said release layer comprises a stay flat liner,
    said swatch sheet being thin and pliable to be attachable to non-flat and flat surfaces,
    said swatch sheet attaching flush to a flat surface,
    said painted swatch sheet being removable and repositionable on said surface.

2. A removable swatch sheet as set forth in claim 1, wherein said paint may be painted on said swatch sheet when said swatch is not attached to said surface.

3. A removable swatch sheet as set forth in claim 1, wherein said paint may be painted on said swatch sheet when said swatch sheet is attached to said surface.

4. A removable swatch sheet as set forth in claim 1, wherein said swatch sheet may be attached to and bend into and around corners of a wall and ceiling.

5. A removable swatch sheet as set forth in claim 1, wherein said paint is latex paint.

6. A removable swatch sheet as set forth in claim 1, wherein said release layer comprises a 50 lb stay flat liner.

* * * * *